(12) United States Patent
Jiang (10) Patent No.: US 11,982,334 B1
(45) Date of Patent: May 14, 2024

(54) CORD LOCK FOR TIGHTENING AND LOOSENING CORD BY CLOCKWISE AND ANTICLOCKWISE ROTATION

(71) Applicant: Xinyue Jiang, Nanchang (CN)

(72) Inventor: Xinyue Jiang, Nanchang (CN)

( * ) Notice: Subject to any disclaimer, the term of this patent is extended or adjusted under 35 U.S.C. 154(b) by 0 days.

(21) Appl. No.: 18/129,853

(22) Filed: Apr. 1, 2023

(30) Foreign Application Priority Data

Nov. 21, 2022 (CN) .......................... 2022114558094

(51) Int. Cl.
*F16G 11/12* (2006.01)
*A43C 7/00* (2006.01)

(52) U.S. Cl.
CPC ............... *F16G 11/12* (2013.01); *A43C 7/00* (2013.01)

(58) Field of Classification Search
CPC .......... F16G 11/12; A43C 7/00; A43C 11/165
See application file for complete search history.

(56) References Cited

U.S. PATENT DOCUMENTS

| | | | | |
|---|---|---|---|---|
| 9,486,039 B2* | 11/2016 | Ha | ........................... | A42B 1/22 |
| 9,622,544 B2* | 4/2017 | Chen | ........................ | A43C 7/02 |
| 9,635,906 B2* | 5/2017 | Midorikawa | ........ | A43C 11/165 |
| 9,717,305 B2* | 8/2017 | Midorikawa | ........ | A43C 11/165 |
| 10,039,345 B2* | 8/2018 | Ha | ..................... | B65H 75/4431 |
| 10,258,109 B2* | 4/2019 | Midorikawa | .......... | A43B 23/02 |
| 10,368,613 B2* | 8/2019 | Ha | ........................... | A43C 7/00 |
| 10,561,204 B2* | 2/2020 | Ha | ........................ | A43C 11/165 |
| 11,220,030 B2* | 1/2022 | Hipwood | ................... | A61F 5/01 |
| 11,390,486 B2* | 7/2022 | Ha | ........................ | A43C 11/165 |
| 11,603,283 B2* | 3/2023 | Kim | ...................... | A43C 11/165 |
| 11,647,813 B1* | 5/2023 | Rao | ........................ | A43C 11/165 24/199 |
| 11,744,329 B2* | 9/2023 | Ha | ........................ | A43C 11/165 24/712.9 |
| 11,839,265 B2* | 12/2023 | So | .......................... | A43C 11/165 |
| 2023/0255320 A1* | 8/2023 | Burt | ........................ | A43C 11/165 242/395 |
| 2023/0354965 A1* | 11/2023 | Kim | ........................ | A43C 11/20 |
| 2023/0398720 A1* | 12/2023 | Hipwood | .................. | A61F 5/01 |

\* cited by examiner

*Primary Examiner* — Robert Sandy
*Assistant Examiner* — Louis A Mercado
(74) *Attorney, Agent, or Firm* — Hawaii Patent Services; Nathaniel K. Fedde; Kenton N. Fedde (57) ABSTRACT

A cord lock for tightening and loosening cord by clockwise and anticlockwise rotation, having a knob, a pawl plate, a hub, a clutch, and a reel. The object is to loosen and tighten the cord is achieved by assembly of the knob, the pawl plate, the hub, the clutch and the reel through clockwise and anticlockwise rotation of the knob. When two ends of a cord are wound in the slots after being threaded through cord holes from cord platforms, the cord can be tightened and loosened alternatively by rotating the knob clockwise or anticlockwise. As the knob rotates clockwise, the clutch and the reel mesh to drive the reel to rotate clockwise, and the cord can be tightened; as the knob rotates anticlockwise, the clutch can elastically deform to disengage the wedge-shaped stoppers from the reel, and the reel can freely rotate to loosen the cord.

20 Claims, 9 Drawing Sheets

CORD LOCK FOR TIGHTENING AND LOOSENING CORD BY CLOCKWISE AND ANTICLOCKWISE ROTATION

TECHNICAL FIELD OF THE INVENTION

The invention relates to the technical field of articles of daily use, in particular to a cord lock for tightening and loosening cord by clockwise and anticlockwise rotation.

BACKGROUND OF THE INVENTION

In daily life, cords or the like are always used for fixing on shoes, medical protecting devices or other daily articles. Take shoes for example, laces of sneakers or canvas shoes are threaded through shoe holes and are tightened with bowknots or other knots. However, shoelaces always go loose when people take exercise. It may be inconvenient to tie up shoelaces again when people are walking or carry things in the hand. Especially in sports, accidents may easily occur when shoelaces go loose.

Some daily articles in the market are provided with cord locking devices, which are of complex construction, with many small parts. Thus, such locking devices are complicated to manufacture and assemble, costly and unstable in structure, high in rejection rate and poor in use experience. A forceable unlocking mechanism may be adopted during use; however, it is not easy to operate since it can be only loosened by pulling upwards after a cord is tightened, and tightening and loosening cannot be operated alternately for fine adjustment of the tightness. Due to complicated structure and small space, parts are small and easily broken, which leads to the safety problems that cords will be loosened or tightened suddenly or the mechanism can be easily cracked.

SUMMARY OF THE INVENTION

Aiming at the shortcomings in the prior art, the purpose of the present invention is to provide a cord lock for tightening and loosening cord by clockwise and anticlockwise rotation, which can be used to loosen and tighten cords by clockwise and anticlockwise rotation, improving efficiency and easy to use.

The technical proposal of the present invention is to provide a cord lock for tightening and loosening cord by clockwise and anticlockwise rotation, comprising a knob, a pawl plate, a hub, a clutch, and a reel; the inner surface of the knob is provided with control ribs arranged oppositely and centered at the circular center of the knob; a plurality of pawl arms are circumferentially arranged around the pawl plate, pawl teeth are peripherally arranged at the ends of the pawl arms, the pawl plate is provided with arc grooves for the control ribs to penetrate, the control ribs can move along the arc grooves by rotating the knob, and the surface of the pawl plate opposite the knob is provided with two pairs of square grooves perpendicular to each other; the inner peripheral wall of the upper end of the hub is provided with ratchet teeth meshing with the pawl teeth, the lower end of the hub is internally provided with a chamber for accommodating the reel, and one side of the chamber close to the ratchet teeth is provided with triangular buckles symmetrically arranged.

The clutch comprises a clutch ring which can elastically deform along the radial direction, the outer side of the clutch ring is provided with positioning blocks corresponding to the square grooves, the positioning blocks can be in slide fit with the square grooves, two opposite positioning blocks are provided with wedge-shaped stoppers, and another two opposite positioning blocks are provided with small elastic arms, the tail ends of the wedge-shaped stoppers extend out of the pawl plate, and the tail ends of the small elastic arms can butt against the two triangular buckles when the clutch ring rotates.

The reel is rotationally mounted in the chamber from the lower end of the hub, and the inner wall of the upper end of the reel is provided with circumferential teeth meshing with the ends of the wedge-shaped stoppers, and when the clutch ring elastically deforms to contract, the wedge-shaped stoppers can separate from the circumferential teeth.

In this technical proposal, the knob, the pawl plate, the hub, the clutch and the reel can be assembled to realize cord tightening and loosening by rotating the knob clockwise and anticlockwise, which is more convenient in use. Among them, the knob and the pawl plate are in close fit, the control ribs are snapped into the corresponding arc grooves, the pawl plate is assembled at the upper end of the hub so that the pawl teeth meshes with the ratchet teeth at the upper end of the hub, the reel is snapped into the chamber from the lower end of the hub, the clutch is mounted between the pawl plate and the reel and comprises the elastic clutch ring, the positioning blocks outside the clutch ring are in slide fit with the square grooves at the lower end of the pawl plate, a pair of wedge-shaped stoppers on the positioning blocks can mesh with the circumferential teeth of the reel, and the small elastic arms butt against the triangular buckles of the hub when the clutch ring rotates; When in use, cords can be tightened and loosened by rotating the knob clockwise or anticlockwise. When the knob rotates clockwise, the clutch ring meshes with the reel, and the reel rotates clockwise to tighten the cord; when the knob rotates anticlockwise, the clutch ring can elastically deform to disengage the wedge-shaped stoppers from the circumferential teeth on the reel and the reel rotates freely to loosen the cord. This technical proposal realizes functions of tightening, loosening, and tightening again and is convenient for daily use.

Further, the knob is peripherally provided with anti-slip threads circumferentially arranged on the knob.

Further, the hub is peripherally provided with fixed flanges circumferentially arranged on the hub, the inner wall of the knob snapped in the upper end of the hub is provided with fixed fasteners, and the fixed fasteners can be snapped in below the fixed flanges so as to prevent the knob from loosening.

Further, the hub is provided with two spacing cord platforms corresponding to the periphery of the chamber, the reel is peripherally provided with slots, the surface of each slot is provided with a cord hole corresponding to each cord platform, the reel is provided with cord passages communicated with the cord holes, and the cord passages are arranged in a U shape.

Further, the inner side of the lower end of the hub is provided with oppositely arranged positioning buckles, the reel is peripherally provided with avoiding notches in movable fit with the positioning buckles, when the avoiding notches of the reel aligned with the positioning buckles can be snapped into the chamber, the cord platforms can be opposite to the cord holes.

Further, the lower end of the hub is peripherally provided with a small fixed lug and a big fixed lug which are oppositely arranged, the end face of the hub corresponding to two sides of the big fixed lug is provided with strip-type markings.

Further, the lower end face of the reel is provided with observation holes corresponding to two sides of one of the avoiding notches, and positioning markings corresponding to two sides of another avoiding notch, and the positioning markings are opposite to the strip-type markings.

Further, the cord lock comprises a base, the upper end of the base is provided with a fixed collar, the inner bottom of the fixed collar is provided with a mounting groove in clamp fit with the fixed lugs, and the fixed collar is also provided with cord grooves arranged oppositely to the cord platforms.

Further, the inner bottom of the base corresponding to the fixed collar is provided with avoiding grooves for accommodating positioning buckles.

Further, the upper end of the fixed collar corresponding to the mounting groove is provided with a detachable mount.

The invention has the advantages that the knob, the pawl plate, the hub, the clutch and the reel can be assembled to realize cord tightening and loosening by rotating the knob clockwise and anticlockwise. When two ends of a cord wind on the slots by way of the cord holes from the cord platform, the knob rotates clockwise or anticlockwise to switch between tightening and loosening; the clockwise-rotating knob drives the pawl plate and the clutch to rotate clockwise, and the reel rotates clockwise to tighten the cord since the clutch meshes with the reel; the anticlockwise-rotating knob drives the pawl plate to turn around and the clutch to elastically deform with the force of friction, in this way, the wedge-shaped stoppers can be disengaged from the inner periphery of the reel and the reel can freely rotate to loosen the cord; the cord lock realizes functions of tightening, loosening, and tightening again and is convenient and practical for daily use.

BRIEF DESCRIPTION OF THE DRAWINGS

To clearly describe the embodiments of the invention or the technical proposals of the prior art, the following description is made in connection with the accompanying drawings wherein similar components or parts are usually designated with similar reference signs and will be not necessarily drawn according to the actual proportions.

FIG. 17 is an explosive view of thereof. Reference signs: knob 100, control rib 110, fixed fastener 120, pawl plate 200, pawl arm 210, ratch 211, arc groove 220, square groove 230, hub 300, ratchet 310, cord platform 320, triangular buckle 330, fixed flange 340, fixed lug 350, positioning buckle 360, strip-type marking 370, clutch 400, clutch ring 410, wedge-shaped stopper 421, small elastic arm 422, reel 500, circumferential teeth 510, slot 520, cord hole 530, observation hole 540, cord passage 541, avoiding notch 550, positioning marking 560, base 600, fixed collar 610, mounting groove 620, cord groove 630, and detachable mount 640.

DETAILED DESCRIPTION OF THE EMBODIMENTS

It should be stated that the functions and methods referred in the invention shall only be common adaptive applications of the prior art. Therefore, the improvement of the invention made on the prior art lies in the connection relation between hardware. The description of the functions and methods of the invention is only for more clearly illustrating and better understanding of the invention.

The embodiments of the invention will be elaborated as follows with reference to the drawings. The following embodiments shown and described are just used for clearly explaining the technical proposal and for illustrative purposes only, and cannot be regard as limitations of the protection scope of the invention.

It should be noted that, unless otherwise specified, the technical or scientific terms used in the present application shall have their usual meanings those skilled in the art to which the present invention belongs can understand.

Embodiment 1

As seen in FIGS. 1 to 9, the embodiment 1 provides a cord lock for tightening and loosening cord by clockwise and anticlockwise rotation. In particular, the cord lock comprises a knob 100, a pawl plate 200, a hub 300, a clutch 400, and a reel 500; the inner surface of the knob 100 is provided with opposed control ribs 110 and centered at the circular center of the knob 100; a plurality of pawl arms 210 are circumferentially arranged on the pawl plate 200, pawl teeth 211 are peripherally arranged at the ends of the pawl arms 210, the pawl plate 200 is provided with arc grooves 220 for the control ribs 110 to penetrate, the control ribs can move along the arc grooves 220 by rotating the knob 100, and the surface of the pawl plate 200 away from the knob 100 is provided with two pairs of square grooves 230 perpendicular to each other; the inner peripheral wall of the upper end of the hub 300 is provided with ratchet teeth 310 meshing with the pawl teeth 211, the lower end of the hub 300 is internally provided with a chamber for accommodating the reel 500, the hub 300 is provided with two spacing cord platforms 320 corresponding to the periphery of the chamber, and one side of the chamber close to the ratchet teeth 310 is provided with triangular buckles 330 symmetrically arranged; the outer side of the clutch ring 410 is provided with positioning blocks 420 corresponding to the square grooves 230, the positioning blocks 420 can be in slide fit with the square grooves 330, two opposite positioning blocks 420 are provided with wedge-shaped stoppers 421, and another two opposite positioning blocks 420 are provided with small elastic arms 422, the tail ends of the wedge-shaped stoppers 421 extend out of the pawl plate 200, and the tail ends of the small elastic arms 422 can be butted against the two triangular buckles 330 when the clutch ring 410 rotates; the reel 500 is rotationally mounted in the chamber from the lower end of the hub 300, and the inner wall of the upper end of the reel 500 is provided with circumferential teeth 510 meshing with the ends of the wedge-shaped stoppers 421, and when the clutch ring 410 elastically deforms to contract, the wedge-shaped stoppers 421 can separate from the circumferential teeth 510; the reel 500 is peripherally provided with slots 520 circumferentially arranged, the surface of each slot 520 is provided with a cord hole 530 corresponding to each cord platform 320, the reel 500 is provided with cord passages 541 communicated with the cord holes 541, and the cord passages 541 are arranged in a U shape.

Figure 16:
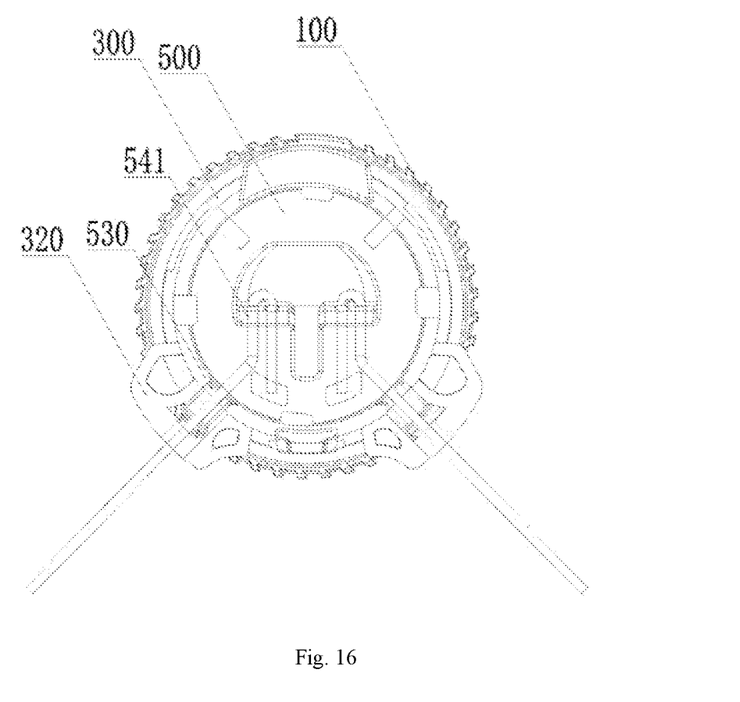
FIG. 16 is a schematic view of cord threading thereof.
Figure 17:
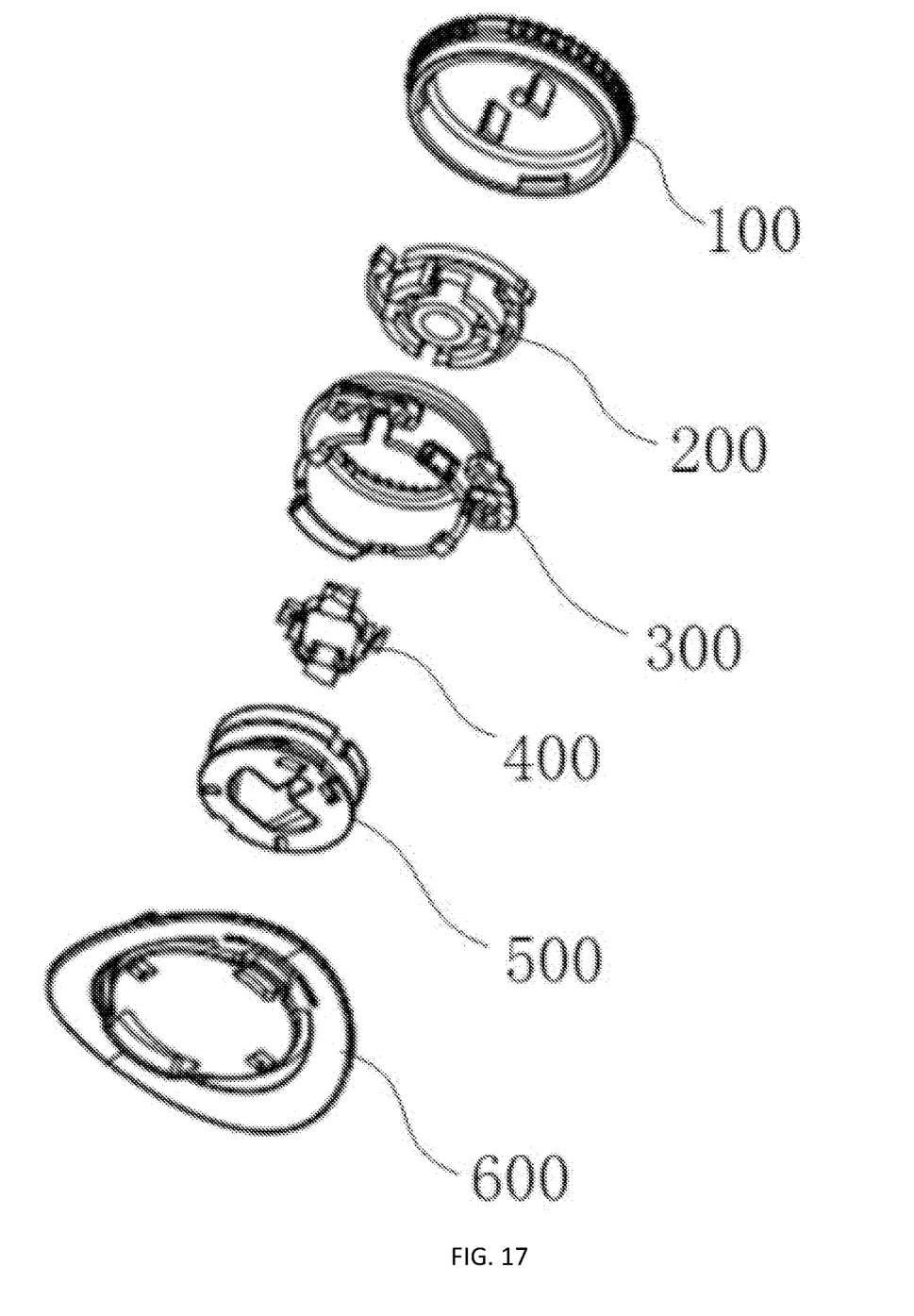

As shown in FIGS. 1 to 9, according to the aforementioned arrangement, the knob 100, the pawl plate 200, the hub 300, the clutch 400 and the reel 500 can be assembled to realize cord tightening and loosening by rotating the knob clockwise and anticlockwise, which is more convenient in use. As the above arrangement, the knob 100 and the pawl plate 200 are in close fit, the control rib 110 at the lower end of the knob 100 is snapped into the corresponding arc groove 220, the pawl plate 200 is assembled at the upper end of the hub 300 so that the pawl teeth 211 mesh with the ratchet teeth 310 at the upper end of the hub 300, the reel 500 is snapped into the chamber from the lower end of the hub 300, the clutch 400 is mounted between the pawl plate 200 and the reel 500, the positioning blocks 420 of the clutch 400 are in slide fit with the square grooves at the lower end of the pawl plate, a pair of wedge-shaped stoppers 421 outside the positioning blocks 420 can mesh with the circumferential teeth 510 of the reel 500; after two ends of a cord are threaded through the cord holes 530 from the cord platform 320, and the cord enters the cord passages 541 and its ends are constrained in a U shape by the cord passages 541; in this way, two ends of the cord are arranged in the reel in a U shape, which can improve the degree of tightness of the cord and avoid loosening, and the status is as shown in FIG. 16 after the operation is completed. After the cord is wound in the slots 520, the cord can be tightened and loosened alternatively by rotating the knob 100 clockwise and anticlockwise. When the knob 100 rotates clockwise, the pawl plate 200 and the clutch 400 are driven to rotate clockwise, since the wedge-shaped stoppers 421 of the clutch 400 mesh with the circumferential teeth on the internal periphery of the reel 500, the reel 500 can rotate clockwise to tighten the cord; when the knob 100 rotates anticlockwise, the control ribs of the knob 100 drives the pawl plate and the clutch to rotate anticlockwise. Since the small elastic arms of the clutch 400 are butted against the triangular buckles 330, the clutch 400 elastically deforms along the radial direction and contracts due to the force of friction, the wedge-shaped stoppers 421 are disengaged from the circumferential teeth on the reel 500 and the reel 400 rotates freely to loosen the cord. Thus, the cord lock realizes functions of tightening, loosening, and tightening again and is convenient for daily use.

Figure 1:
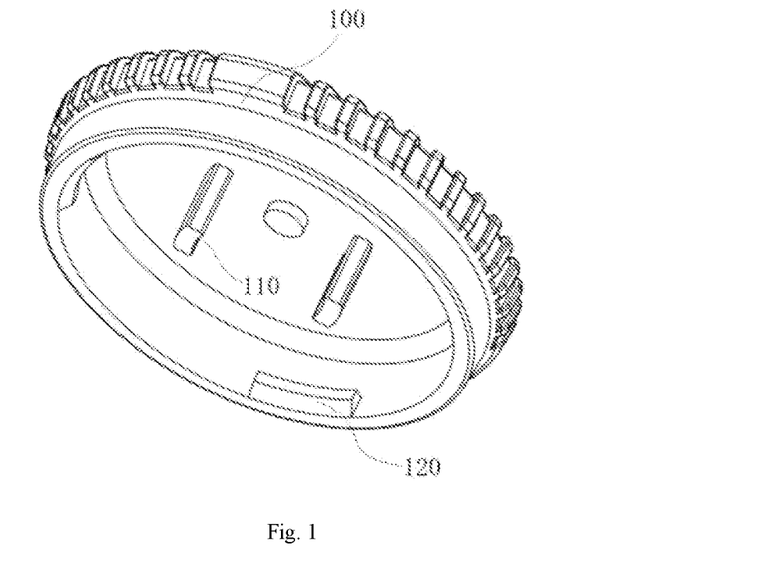
FIG. 1 is a three-dimensional view of the cord lock for tightening and loosening cord by clockwise and anticlockwise rotation provided in the embodiment of the invention.
Figure 2:
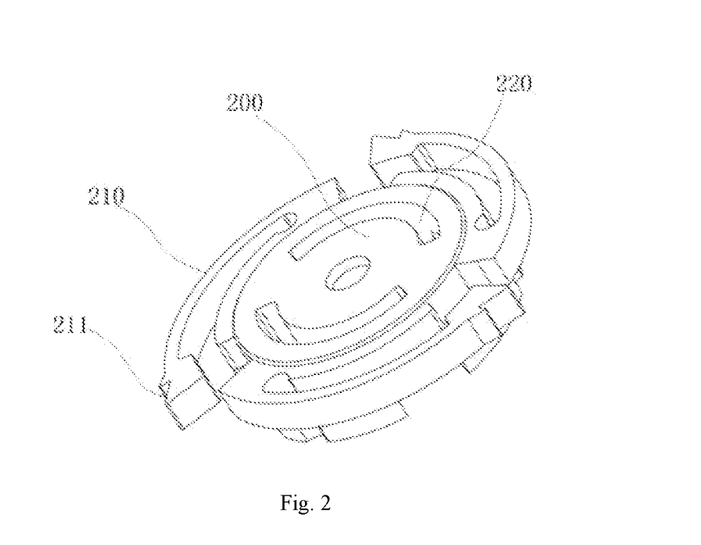
FIG. 2 is a three-dimensional view 1 of the pawl plate thereof.
Figure 3:
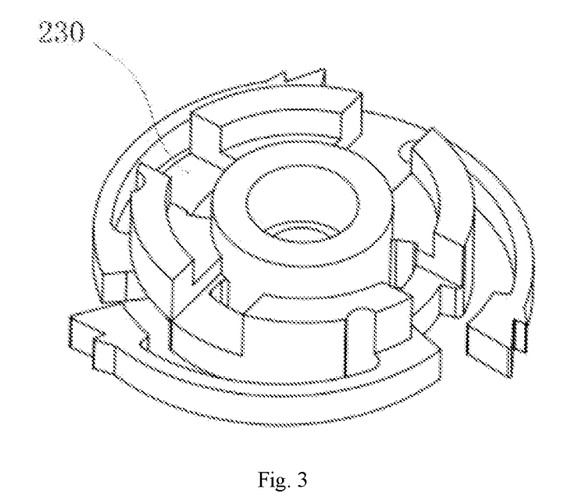
FIG. 3 is a three-dimensional view 2 of the pawl plate thereof.
Figure 4:
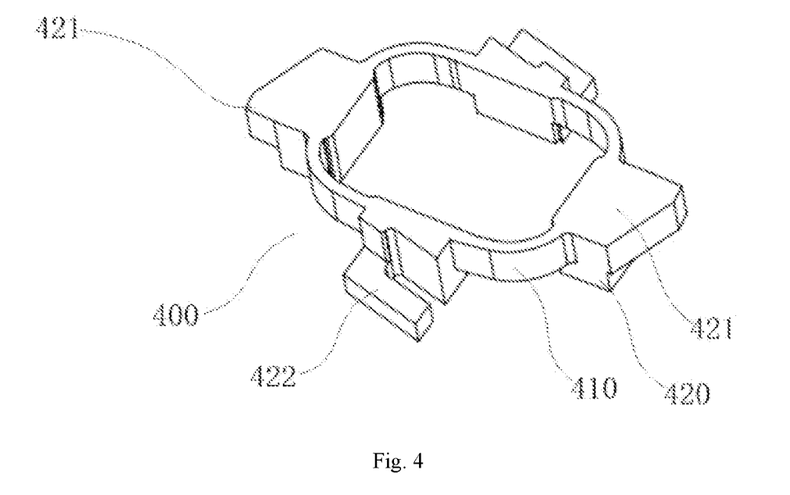
FIG. 4 is a three-dimensional view of the clutch thereof.
Figure 5:
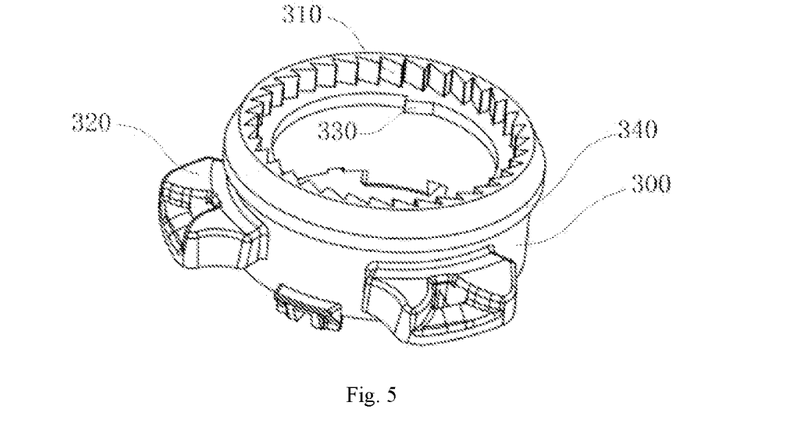
FIG. 5 is a three-dimensional view 1 of the hub thereof.
Figure 6:
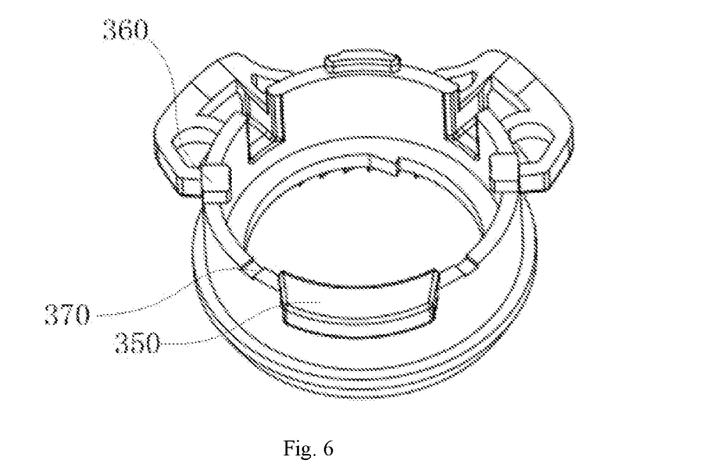
FIG. 6 is a three-dimensional view 2 of the hub thereof.
Figure 7:
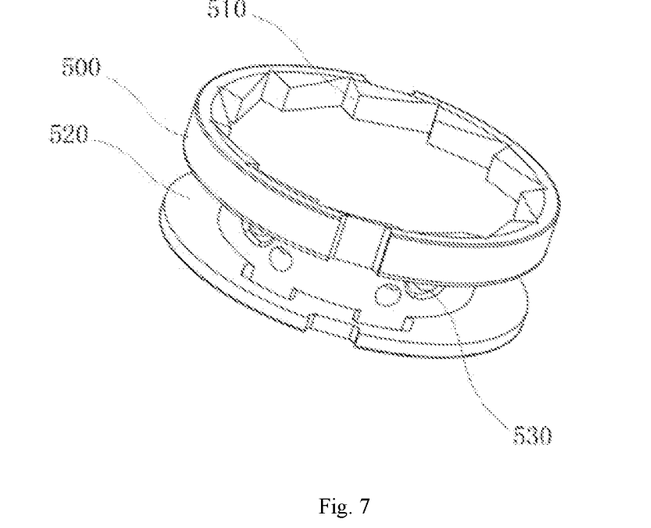
FIG. 7 is a three-dimensional view 1 of the reel thereof.
Figure 8:
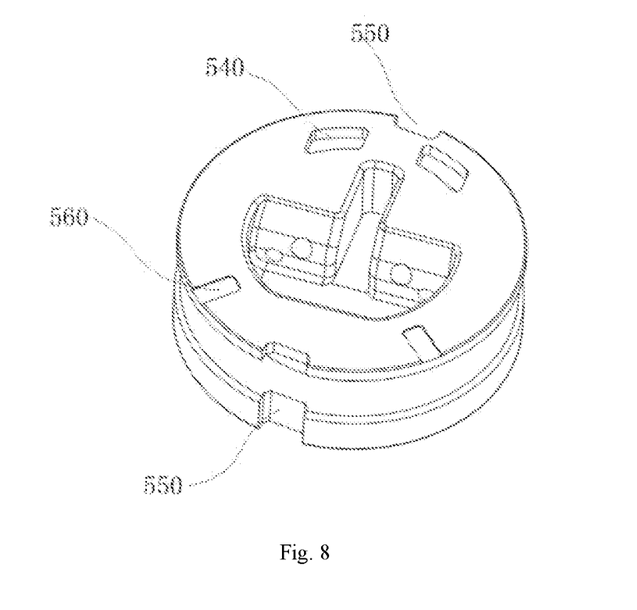
FIG. 8 is a three-dimensional view 2 of the reel thereof.

As shown in FIG. 1, to make the knob 100 rotate clockwise or anticlockwise more easily, the knob 100 of the present embodiment is peripherally provided with anti-slip threads.

As previously mentioned, the knob 100 and the pawl plate 200 are assembled and mounted at the upper end of the hub 300. To protect the knob 100 from falling off and make sure its rotational state, the hub 300 is peripherally provided with fixed flanges 340 surrounding the hub 300, the inner wall of the knob 100 snapped into the upper end of the hub 300 is provided with fixed fasteners 120, the fixed fasteners 120 can be snapped in below the fixed flanges 340 to prevent the knob 100 from falling off. When the knob 100 is snapped into the upper end of the hub 300, the fixed fasteners 120 are in movable fit with the fixed flanges 340 to assemble the knob 100 and the hub 300.

As previously mentioned, when the reel 500 is assembled with the clutch 400, the lower end of the hub 300 is installed in the chamber, the inner side of the lower end of the hub 300 is provided with oppositely arranged positioning buckles 360, the reel 500 is peripherally provided with avoiding notches 550 in movable fit with the positioning buckles 360, when the avoiding notches 550 of the reel 500 aligned with the positioning buckles 360 can be snapped into the chamber, the cord platforms 320 can be opposite to the cord holes 530. Thus, the positioning buckles 360 can form a positioning assembly. During assembling, the reel 500 can be mounted in the chamber of the hub 300 through the avoiding notches 550. After assembling is completed, the cord platforms 320 are opposite to the cord holes 530, whereby the cord may be easily threaded into the reel 500 from outside.

As seen in FIGS. 1 to 9, to make the installation easy, the lower end of the hub 300 is peripherally provided with a small fixed lug 350 and a big fixed lug 350 which are oppositely arranged, and the fixed lugs 350 are used for mounting the hub 300. In practical use, to make the cord be easily threaded, the end faces of the hub 300 corresponding to two sides of the big fixed lug 350 are provided with strip-type markings 370. The lower end faces of the reel 500 corresponding to two sides of one of the avoiding notches 550 are provided with observation holes 540, and positioning markings 560 corresponding to two sides of another avoiding notch 550, and the positioning markings 560 are opposite to the strip-type markings 370. The structure of the observation holes 540 and the positioning markings 560 can guarantee convenience in cord locking.

Embodiment 2

Figure 9:
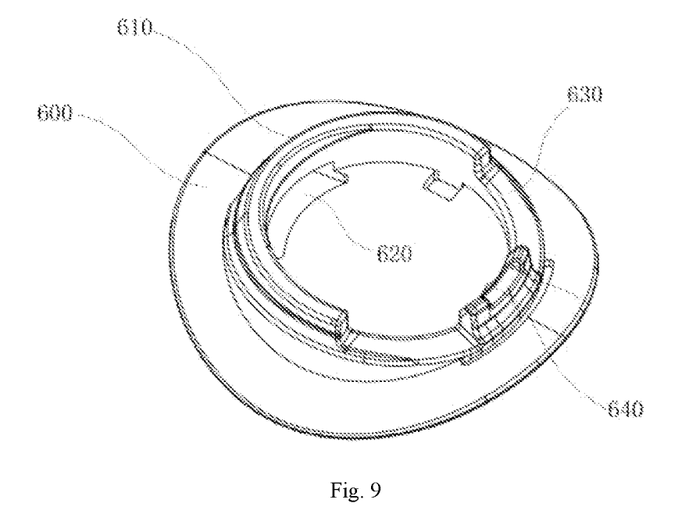
FIG. 9 is a three-dimensional view of the base thereof.

As shown in FIG. 9, the present embodiment provides a base 600 of assembly of an installation embodiment, the upper end of the base 600 is provided with a fixed collar 610, the inner bottom of the fixed collar 610 is provided with a mounting groove 620 in clamp fit with the fixed lugs 350, and the fixed collar 610 is also provided with cord grooves 630 arranged oppositely to the cord platforms 320. In this way, when the knob 100, the pawl plate 200, the hub 300, the clutch 400 and the reel 500 are assembled, the fixed lugs 350 at the lower end of the hub 300 can be snapped into the mounting groove 620 in the fixed collar to guarantee stability of assembly. In addition, the bottom of the hub 300 is provided with positioning buckles 360. Of the present embodiment, in order to prevent interference of the base 600 corresponding to the fixed collar 610, the inner bottom of the base 600 is provided with avoiding grooves for accommodating the positioning buckles 360. With reference to the present embodiment, for the convenience of disassembly in actual use, the upper end of the fixed collar 610 corresponding to the upper of the mounting groove 620 is provided with a detachable mount 640. With the detachable mount 640, the hub 300 can be easily detached and other operations are facilitated.

Embodiment 3

Figure 10:
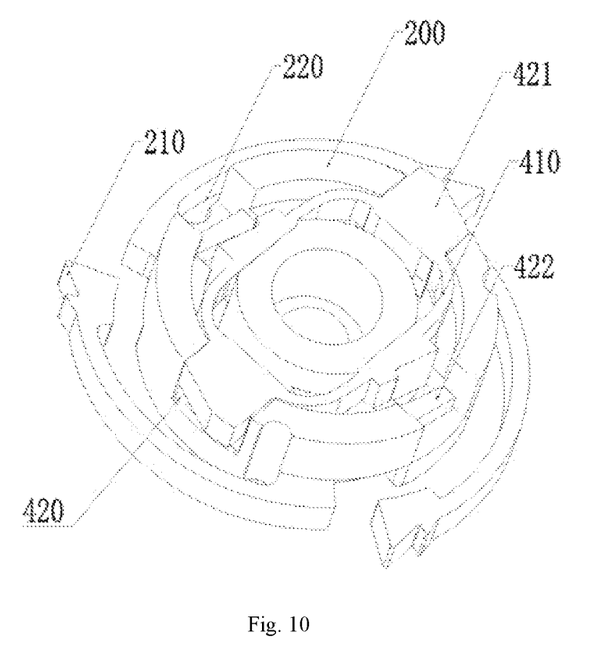
FIG. 10 is a three-dimensional view of the pawl plate fitting with the clutch thereof.
Figure 11:
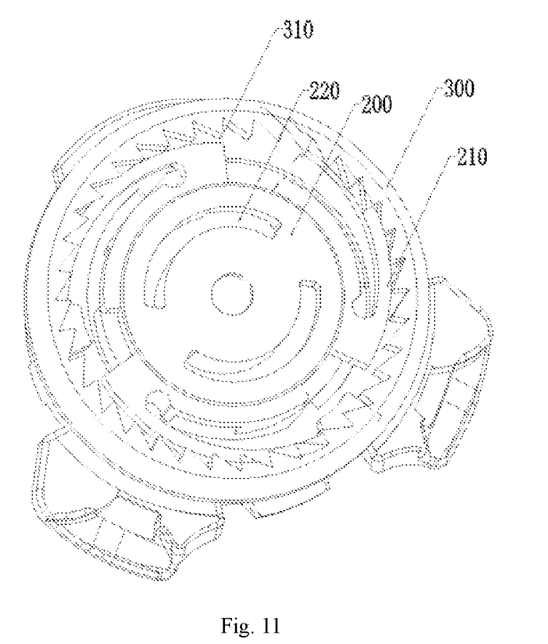
FIG. 11 is a three-dimensional view of the pawl plate fitting with the hub thereof.
Figure 12:
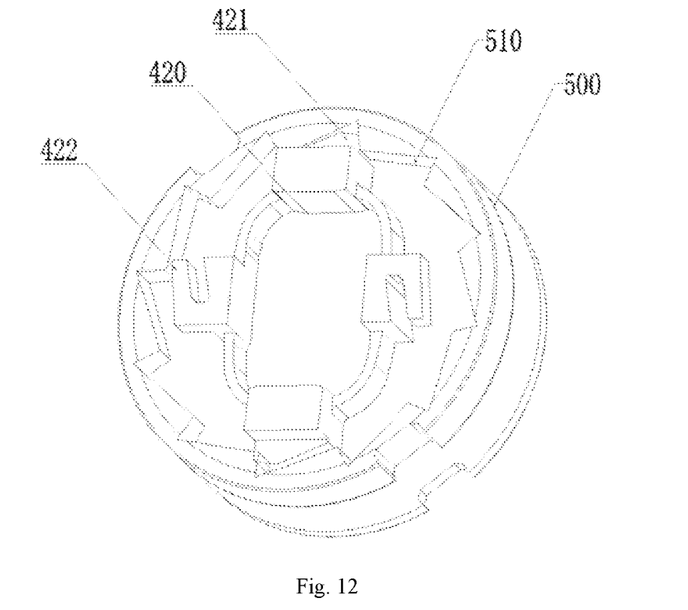
FIG. 12 is a three-dimensional view of the clutch fitting with the hub thereof.
Figure 13:
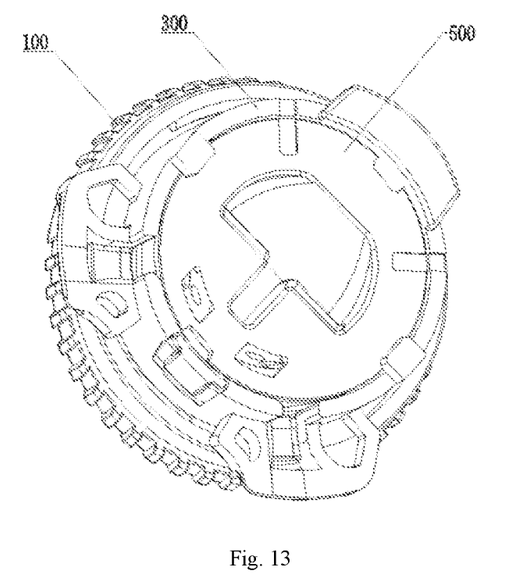
FIG. 13 is a three-dimensional view 1 of the reel fitting with the hub thereof.
Figure 14:
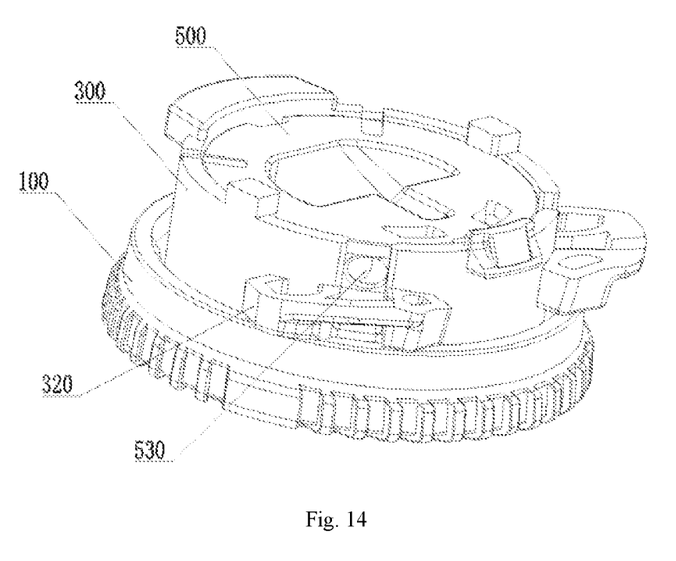
FIG. 14 is a three-dimensional view 2 of the reel fitting with the hub thereof.
Figure 15:
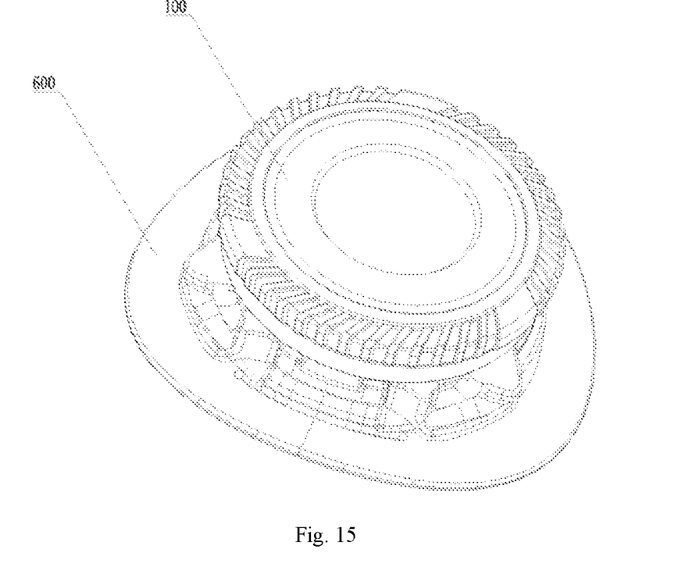
FIG. 15 is a three-dimensional view of the assembly thereof.

According to the assembled structure and the base structure provided in the embodiment 1 and the embodiment 2, the installation of the cord lock needs the following steps:

A. Firstly, install the pawl plate 200 into the upper end of the hub 300 such that the pawl teeth 211 around the tail ends of the pawl arms 210 mesh with the ratchet teeth 310 on the inner wall of the upper end of the hub 300, as shown in FIGS. 10 to 14.
B. Insert two control ribs 110 on the inner end face of the knob 100 into the arc grooves 220 of the pawl plate 200, press hard on the fixed fasteners 120 of the inner periphery of the knob 100 into the fixed flanges 340 of the hub 300 until a "click-clack" sound is heard, and snap the knob 100 into the waist of the hub 300. Thus, these parts can be assembled into a component.
C. Install the clutch 400 into the lower end of the pawl plate 200 as the following steps: rotate the control ribs 110 of the knob 100 to the end of the arc grooves 220 of the pawl, whereby the wedge-shaped stoppers 421 of the clutch 400 and the small elastic arms 422 are correspondingly snapped into the square grooves 230; install the reel 500 into the hub 300, with one side of the reel 500 having circumferential teeth 510 facing the inside of the hub 300, aligning two avoiding notches 550 in the reel 500 with the positioning buckles 360 of the hub 300 so that the reel 500 can be placed into the chamber, press to the greatest extent and rotate the knob 100 so that the two control ribs 110 on the knob 100 will drive the pawl plate 200 and the clutch 400 to rotate, by which the clutch 400 can be snapped in between the reel 500 and the pawl plate 200 if the two wedge-shaped stoppers 421 on the clutch 400 are matched with the circumferential teeth 510 on the reel 500. At this time, assembly in the wedge-shaped stoppers 421 of the clutch 400 and the reel 500 is as illustrated in FIG. 12. Assembly in the small elastic arms 422 of the clutch 400 is as illustrated in FIG. 10. Assembly in the clutch 400, the pawl plate 200 and the reel 500 are as illustrated in FIG. 13 and FIG. 14 (wherein the clutch 400 sandwiched in the pawl plate 200 and the reel 500 plays a clutching role).
D. Thread a cord of specific material into two cord holes 530 of the reel according to the following steps: rotate the knob 100 clockwise, whereby the control ribs 110 of the knob 100 drives the pawl plate 200 and the clutch 400 to rotate, the wedge-shaped stoppers 421 of the clutch 400 mesh with the circumferential teeth 510 of the reel 500 to drive the reel 500 to rotate clockwise, and two positioning markings 560 in the reel 500 align with the strip-type markings 370 in the hub during rotation; at this time, through the cord platforms 320 of the hub 300, the cord holes 530 on the reel 500 can be seen; thread the cord through the cord platforms 320 of the hub 300 and then into the cord holes 530 of the reel 500, and out from the other side of the holes, thread one end of the cord from the cord hole 530 on the same side, tighten the cord from outside when it can be seen from the observation holes 540 of the reel 500 that the end of the cord is exposed outside the cord hole 530 outside of the reel 500, such that the cord can be fixed on the reel 500 firmly. Likewise, thread the other end of the cord into the cord hole of the reel on the other side so that this end of the cord can be firmly fixed on the reel 500.
E. Install assembly (comprising five parts, they are the knob 100, the pawl plate 200, the hub 300, the clutch 400 and the reel 500) of the knob 100 with the cord being threaded into the base 600. The method is to align the fixed lugs 350 on the hub 300 with the mounting grooves 520 on the base 600, slightly push until the "click-clack" sound is heard; at this time, the knob 100 and the base 600 are assembled in place, as shown in FIG. 15.

Embodiment 4

This embodiment provides modes of carrying out specific functions of the invention:

Tightening: rotate the knob 100 clockwise, whereupon two control ribs 110 of the knob 100 will rotate to the end of the arc grooves 220 in the pawl plate 200 and push the pawl plate 200 to rotate clockwise, the square grooves 230 in the pawl plate 200 will drive the wedge-shaped stoppers 421 and the small elastic arms 422 in the clutch to rotate clockwise, thus driving the clutch 400 to drive clockwise. By this time, the control ribs 110 of the knob 100 in the arc grooves 220 of the pawl plate 200 hold against the inner sides of the wedge-shaped stoppers 421 in the clutch 400, and the wedge-shaped stoppers 421 mesh with the circumferential teeth of the reel 500, whereupon the reel 500 is driven to rotate clockwise to achieve the object of tightening. The end faces of the pawl teeth 211 in the pawl plate 200 hold against the tooth surface of the ratchet teeth 310 in the hub 300 to fasten assembly of the hub 300, the pawl plate 200, the clutch 400 and the reel 500, which can prevent the assembly from rotating anticlockwise and achieve the object that the cord will not be loosened.

Loosening: rotate the knob 100 anticlockwise (when the knob 100 rotates, the pawl teeth 211 of the pawl plate 200 hold against the tooth surface of the ratchet teeth 310 in the hub 300, and the pawl plate 200 is fixed relative to the hub 300), whereupon the two control ribs 110 in the knob 100 move into the other end of the arc grooves 220 anticlockwise along the arc grooves 220 in the pawl plate 200, the outer sides of the control ribs will push the inner wall of the clutch ring 410 of the clutch 400, then the small elastic arms 422 of the clutch will moves outwardly along the square grooves 230 in the pawl plate 200, the clutch ring 410 radially deforms and contracts to make the wedge-shaped stoppers 421 move inwardly along the square grooves 230, and then the wedge-shaped stoppers 421 will separate from the circumferential teeth 510 of the reel 500, whereby the reel 500 can rotate circumferentially without limitations, and the object of loosening is achieved.

From loosening to tightening again: at the beginning, the two control ribs 110 of the knob 100 stay at the ends of the arc grooves 200 in the pawl plate 200. By this time, rotate the knob 100 clockwise, whereupon the outer walls of the control ribs 110 will drive the clutch 400 to rotate clockwise because of friction generated by mutual compression between the inner walls of the small elastic arms 422 of the clutch 400 and the outer walls of the control ribs of the knob 100, and the clutch 400 will drive the pawl plate 200 to rotate clockwise through the small elastic arms 422. When the clutch 400 rotates to the small elastic arms 422 and touches the triangular buckles 330 on the hub 300, and the triangular buckles 330 will stop the small elastic arms from rotating, at the time when the control ribs 110 of the knob 100 and the clutch 400 move, keep rotating the knob 100 until the control ribs 110 reaches the other end of the arc grooves 220, whereupon the wedge-shaped stoppers 421 on the clutch 400 are pushed towards the circumferential teeth 510 of the reel 500 by the control ribs 110 and mesh with them, the reel 500 is pushed to rotate clockwise, and the cord with ends fixed in the cord holes 530 of the reel 500 is wound into the slots 520, thus, the object of tightening is achieved.

The description of the present invention includes many specific examples. However, it should be understood that the embodiments of the present invention can be practiced without them. In some embodiments, methods, systems and techniques of public knowledge are not elaborated for the purposes of not making confused.

It should be stated that the specific embodiments as shown and described herein is for purposes of illustrating the technical proposal of the present invention and not for limitations. Although the present invention has been described in connection with the foregoing examples, those skilled in the art should understand that they can still make changes on the basis of the foregoing embodiments or equivalents to a part of or all technical characteristics. However, these changes or equivalents and their technical proposals will not depart from the scope of the embodiments of the present invention, and should fall within the scope of the appended claims and description.

What is claimed is:

1. A cord lock for tightening and loosening cord by clockwise and anticlockwise rotation, comprising a knob (100), a pawl plate (200), a hub (300), a clutch (400), and a reel (500);
   an inner surface of the knob (100) is provided with control ribs (110) arranged oppositely and centered at a circular center of the knob (100);
   a plurality of pawl arms (210) are circumferentially arranged around the pawl plate (200), pawl teeth (211) are peripherally arranged at ends of the pawl arms (210), the pawl plate (200) is provided with arc grooves (220) for the control ribs (110) to penetrate, the control ribs (110) can move along the arc grooves (220) by rotating the knob (100), and a surface of the pawl plate (200) away from the knob (100) is provided with two pairs of square grooves (230) perpendicular to each other;
   an inner peripheral wall of an upper end of the hub (300) is provided with ratchet teeth (310) meshing with the pawl teeth (211), a lower end of the hub (300) is internally provided with a chamber for accommodating the reel (500), and one side of the chamber close to the ratchet teeth (310) is provided with triangular buckles (330) symmetrically arranged;
   the clutch (400) comprises a clutch ring (410) which can elastically deform along a radial direction, an outer side of the clutch ring (410) is provided with positioning blocks (420) corresponding to the square grooves (230), the positioning blocks (420) can be in slide fit with the square grooves (330), two opposite positioning blocks (420) are provided with wedge-shaped stoppers (421), and another two opposite positioning blocks (420) are provided with small elastic arms (422), tail ends of the wedge-shaped stoppers (421) extend out of the pawl plate (200), and the tail ends of the small elastic arms (422) can butt against the two triangular buckles (330) when the clutch ring (410) rotates;
   the reel (500) is rotationally mounted in the chamber from the lower end of the hub (300), and an inner wall of an upper end of the reel (500) is provided with circumferential teeth (510) meshing with ends of the wedge-shaped stoppers (421), and when the clutch ring (410) elastically deforms to contract, the wedge-shaped stoppers (421) can separate from the circumferential teeth (510).

2. The cord lock for tightening and loosening cord by clockwise and anticlockwise rotation of claim 1, wherein the hub (300) is provided with two spacing cord platforms (320) corresponding to a periphery of the chamber, the reel (500) is peripherally provided with slots (520) circumferentially arranged, a surface of each slot (520) is provided with a cord hole (530) corresponding to each of the cord platforms (320), the reel (500) is provided with cord passages (541) communicated with the cord holes (530), and the cord passages (541) are arranged in a U shape.

3. The cord lock for tightening and loosening cord by clockwise and anticlockwise rotation of claim 2, further comprising a base (600), an upper end of the base (600) is provided with a fixed collar (610), an inner bottom of the fixed collar (610) is provided with a mounting groove (620) in clamp fit with fixed lugs (350), and the fixed collar (610) is also provided with cord grooves (630) arranged oppositely to the cord platforms (320).

4. The cord lock for tightening and loosening cord by clockwise and anticlockwise rotation of claim 3, wherein an inner bottom of the base (600) corresponding to the fixed collar (610) is provided with avoiding grooves for accommodating positioning buckles (360).

5. The cord lock for tightening and loosening cord by clockwise and anticlockwise rotation of claim 1, wherein the knob (100) is peripherally provided with anti-slip threads circumferentially arranged on the knob (100).

6. The cord lock for tightening and loosening cord by clockwise and anticlockwise rotation of claim 5, further comprising a base (600), an upper end of the base (600) is provided with a fixed collar (610), an inner bottom of the fixed collar (610) is provided with a mounting groove (620) in clamp fit with fixed lugs (350), and the fixed collar (610) is also provided with cord grooves (630) arranged oppositely to the cord platforms (320).

7. The cord lock for tightening and loosening cord by clockwise and anticlockwise rotation of claim 6, wherein an inner bottom of the base (600) corresponding to the fixed collar (610) is provided with avoiding grooves for accommodating positioning buckles (360).

8. The cord lock for tightening and loosening cord by clockwise and anticlockwise rotation of claim 1, wherein the hub (300) is peripherally provided with fixed flanges (340) circumferentially arranged on the hub (300), an inner wall of the knob (100) snapped in the upper end of the hub (300) is provided with fixed fasteners (120), and the fixed fasteners (120) can be snapped in below the fixed flanges (340) so as to prevent the knob (100) from loosening.

9. The cord lock for tightening and loosening cord by clockwise and anticlockwise rotation of claim 8, further comprising a base (600), an upper end of the base (600) is provided with a fixed collar (610), an inner bottom of the fixed collar (610) is provided with a mounting groove (620) in clamp fit with fixed lugs (350), and the fixed collar (610) is also provided with cord grooves (630) arranged oppositely to the cord platforms (320).

10. The cord lock for tightening and loosening cord by clockwise and anticlockwise rotation of claim 9, wherein an inner bottom of the base (600) corresponding to the fixed collar (610) is provided with avoiding grooves for accommodating positioning buckles (360).

11. The cord lock for tightening and loosening cord by clockwise and anticlockwise rotation of claim 1, wherein an inner side of the lower end of the hub (300) is provided with oppositely arranged positioning buckles (360), the reel (500) is peripherally provided with avoiding notches (550) in movable fit with the positioning buckles (360), when the avoiding notches (550) of the reel (500) aligned with the positioning buckles (360) can be snapped into the chamber, cord platforms (320) can be opposite to cord holes (530).

12. The cord lock for tightening and loosening cord by clockwise and anticlockwise rotation of claim 11, wherein the lower end of the hub (300) is peripherally provided with a small fixed lug (350) and a big fixed lug (350) which are oppositely arranged, end faces of the hub (300) corresponding to two sides of the big fixed lug (350) are provided with strip-type markings (370).

13. The cord lock for tightening and loosening cord by clockwise and anticlockwise rotation of claim 12, further comprising a base (600), an upper end of the base (600) is provided with a fixed collar (610), an inner bottom of the fixed collar (610) is provided with a mounting groove (620) in clamp fit with fixed lugs (350), and the fixed collar (610) is also provided with cord grooves (630) arranged oppositely to the cord platforms (320).

14. The cord lock for tightening and loosening cord by clockwise and anticlockwise rotation of claim 13, wherein an inner bottom of the base (600) corresponding to the fixed collar (610) is provided with avoiding grooves for accommodating positioning buckles (360).

15. The cord lock for tightening and loosening cord by clockwise and anticlockwise rotation of claim 12, wherein lower end faces of the reel (500) are provided with observation holes (540) corresponding to two sides of one of the avoiding notches (550), and positioning markings (560) corresponding to two sides of another avoiding notch (550), and the positioning markings (560) are opposite to the strip-type markings (370).

16. The cord lock for tightening and loosening cord by clockwise and anticlockwise rotation of claim 11, further comprising a base (600), an upper end of the base (600) is provided with a fixed collar (610), an inner bottom of the fixed collar (610) is provided with a mounting groove (620) in clamp fit with fixed lugs (350), and the fixed collar (610) is also provided with cord grooves (630) arranged oppositely to the cord platforms (320).

17. The cord lock for tightening and loosening cord by clockwise and anticlockwise rotation of claim 16, wherein an inner bottom of the base (600) corresponding to the fixed collar (610) is provided with avoiding grooves for accommodating positioning buckles (360).

18. The cord lock for tightening and loosening cord by clockwise and anticlockwise rotation of claim 1, further comprising a base (600), an upper end of the base (600) is provided with a fixed collar (610), an inner bottom of the fixed collar (610) is provided with a mounting groove (620) in clamp fit with fixed lugs (350), and the fixed collar (610) is also provided with cord grooves (630) arranged oppositely to the cord platforms (320).

19. The cord lock for tightening and loosening cord by clockwise and anticlockwise rotation of claim 18, wherein the inner bottom of the base (600) corresponding to the fixed collar (610) is provided with avoiding grooves for accommodating positioning buckles (360).

20. The cord lock for tightening and loosening cord by clockwise and anticlockwise rotation of claim 18, wherein the upper end of the fixed collar (610) corresponding to the mounting groove (620) is provided with a detachable mount (640).

* * * * *